US008157239B2

(12) United States Patent
Owen (10) Patent No.: US 8,157,239 B2
(45) Date of Patent: Apr. 17, 2012

(54) SEAT MOUNTED APPARATUS (76) Inventor: Michael Todd Owen, Taylorsville, GA (US)

(*) Notice: Subject to any disclaimer, the term of this patent is extended or adjusted under 35 U.S.C. 154(b) by 0 days.

(21) Appl. No.: 13/070,729

(22) Filed: Mar. 24, 2011

(65) Prior Publication Data
US 2011/0233357 A1 Sep. 29, 2011

Related U.S. Application Data (60) Provisional application No. 61/317,060, filed on Mar. 24, 2010.

(51) Int. Cl.
*A01K 97/10* (2006.01)
(52) U.S. Cl. .......... 248/534; 248/535; 248/512; 43/21.2
(58) Field of Classification Search .......... 248/534, 248/535, 538, 539, 512, 513, 514, 515, 517, 248/518; 43/21.2
See application file for complete search history.

(56) References Cited

U.S. PATENT DOCUMENTS

| | | | | | |
|---|---|---|---|---|---|
| 2,529,148 | A | * | 11/1950 | Fratt | 248/515 |
| 3,802,112 | A | * | 4/1974 | Banner | 43/21.2 |
| 4,551,939 | A | * | 11/1985 | Kitchens | 43/21.2 |
| 4,682,438 | A | * | 7/1987 | Arrow | 43/21.2 |
| 5,127,181 | A | * | 7/1992 | Teixeira | 43/21.2 |
| 5,396,915 | A | * | 3/1995 | Bomar | 135/16 |
| 5,588,630 | A | * | 12/1996 | Chen-Chao | 248/514 |
| 2005/0102881 | A1 | * | 5/2005 | Legendziewicz | 43/21.2 |

* cited by examiner

*Primary Examiner* — Anita M King
(74) *Attorney, Agent, or Firm* — Cantor Colburn LLP

(57) ABSTRACT

An apparatus includes a mounting member including a first planar surface and an opposing second planar surface, a first extension member extending from the first planar surface, and a first accessory holder portion connected to the first extension member.

12 Claims, 11 Drawing Sheets

SEAT MOUNTED APPARATUS

This application claims the benefit of U.S. Provisional Application No. 61/317,060, filed Mar. 24, 2010.

BACKGROUND OF THE INVENTION

Boats often include one or more seats that may be used for various tasks such as, for example, fishing with a fishing rod. The seats may be mounted on a pedestal, which, in turn, may be mounted to a deck of the boat.

SUMMARY

According to one embodiment of the present invention, an apparatus includes a mounting member including a first planar surface and an opposing second planar surface, a first extension member extending from the first planar surface, and a first accessory holder portion connected to the first extension member.

According to another embodiment of the present invention, an apparatus includes a mounting member including a first planar surface and an opposing second planar surface, the mounting member defining at least one mounting hole communicative with the first planar surface and the second planar surface, a first extension member extending from the first planar surface, and a first accessory holder portion connected to the first extension member.

According to yet another embodiment of the present invention, a method for mounting an apparatus to a seat includes arranging the apparatus including a mounting member, a first extension member extending from the first planar surface, and a first accessory holder portion connected to the first extension member on a seat support portion, arranging the seat on a planar surface of the mounting member, and securing the mounting member and the seat to the seat support portion with a fastener.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The foregoing and other aspects, features, and advantages of the invention are apparent from the following detailed description taken in conjunction with the accompanying drawings in which.

The detailed description explains the preferred embodiments of the invention, together with advantages and features, by way of example with reference to the drawings.

DETAILED DESCRIPTION OF THE INVENTION

Figure 1:
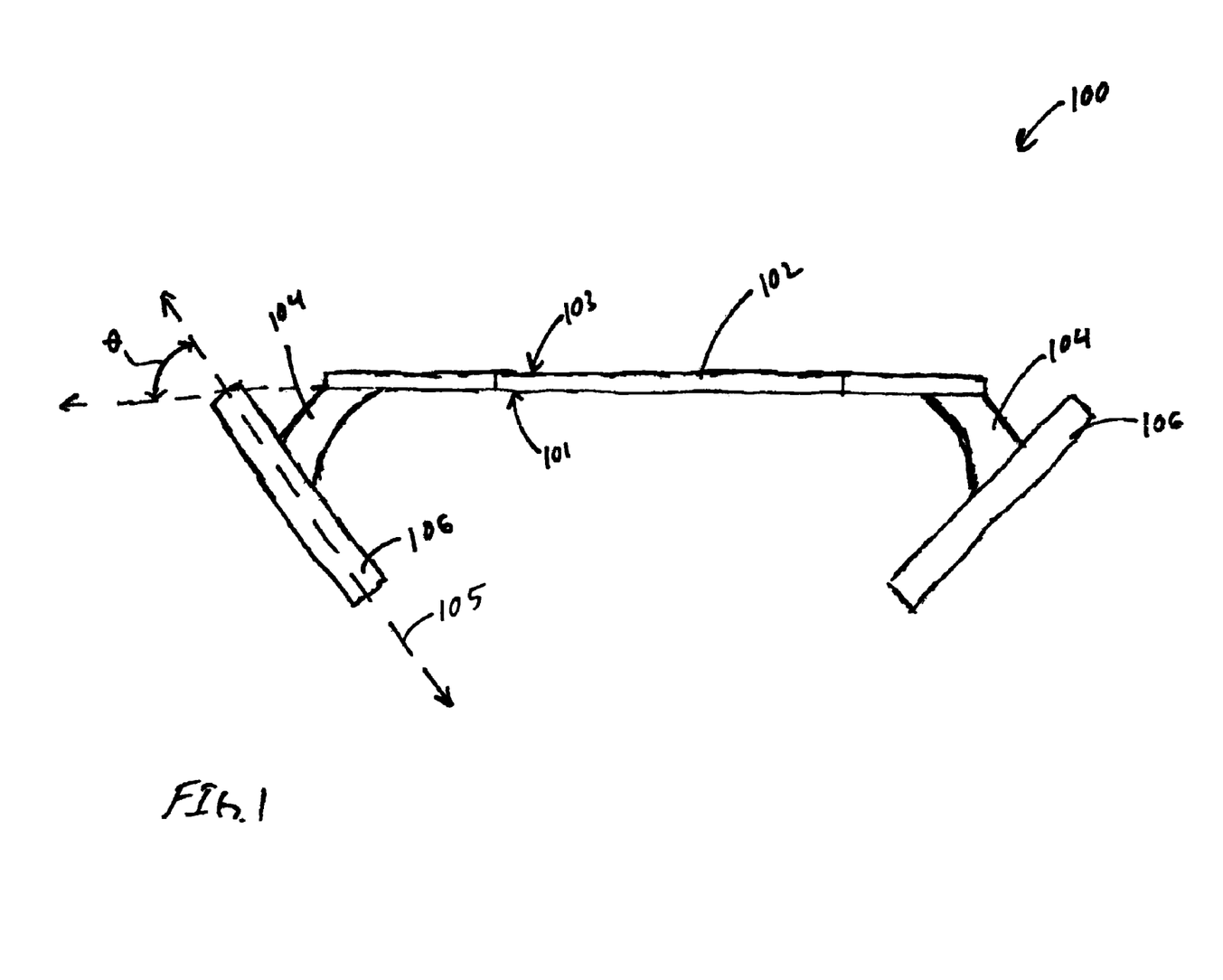
FIG. 1 illustrates a side view of an exemplary embodiment of a holding apparatus.

FIG. 1 illustrates a side view of an exemplary embodiment of a holding apparatus 100. The holding apparatus 100 includes a mounting member 102 having a first planar surface 101 and an opposing second planar surface 103, extension members (arms) 104 extending from the mounting member 102, and accessory holders 106 connected to the extension members 104. In the illustrated embodiment, the apparatus 100 may be formed from any type or combination of materials such as, for example, steel or aluminum, plastic, wood, or composite materials. The extension members 104 may be connected to the mounting member 102 with any type of appropriate joining method such as, for example, welding or brazing, or fasteners such as screws, bolts or other fastening means such as snap-fit joints. The extension members 104 may be integrally formed and connected to the mounting member 102 such as, for example, through a plastic molding process that forms the mounting member 102 and integrally connected extension members 104. The accessory holders 106 may be connected to the extension members 104 with any appropriate joining method described above. In the illustrated embodiment, the accessory holders 106 are tubular and define a longitudinal axis 105 that is arranged at an angle ($\theta$) to the first planar surface 101. In alternate embodiments, the angle $\theta$ may include a right angle such that the axis 105 is substantially perpendicular to the first planar surface 101.

Figure 2:
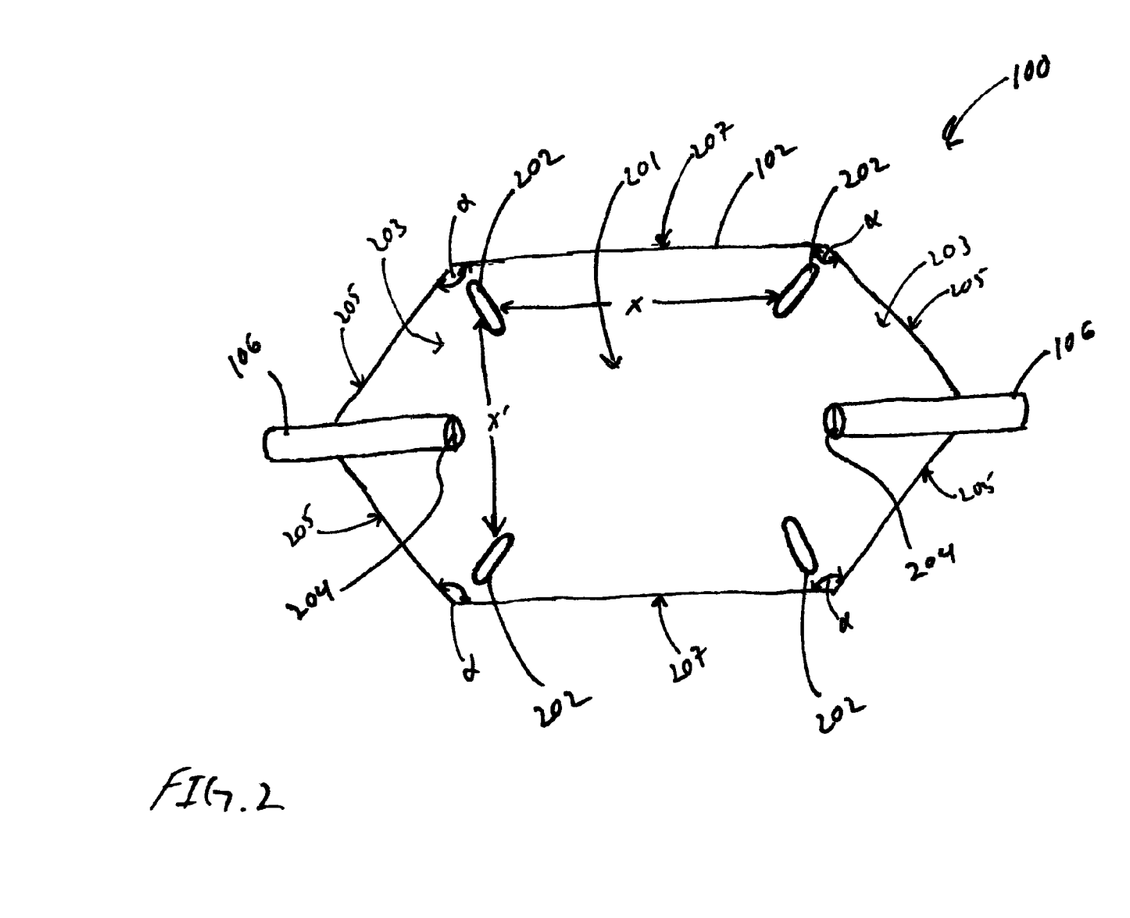
FIG. 2 illustrates a bottom view of the apparatus of FIG. 1.

FIG. 2 illustrates a bottom view of the apparatus 100. The apparatus 100 includes mounting holes 202 defined by the mounting member 102. The mounting holes 202 may be any appropriate shape such as, for example, round, elliptical, square, or slotted. The mounting holes 202 are sized and shaped to engage fasteners (described below), and partially define a mounting region 201. The mounting region includes edges 207 that may be arranged in parallel to each other however, alternate embodiments may include other arrangements of the edges 207 including, for example, a plurality of edges arranged in a geometric shape. The mount member 102 defines triangular shaped extension regions 203 that are partially defined by edges 205 of the mounting member 102 and the mounting region 201. The edges 205 and 207 define oblique angles ($\alpha$) in the illustrated embodiment however, alternate embodiments may include any type of angle including, for example a right angle. Though the extension regions 203 of the illustrated embodiment are triangular shaped, alternate embodiments may include extension regions 203 that are alternate shapes such as, for example, rectangular or trapezoidal shaped. The accessory holders 106 in the illustrated embodiment are tubular and include impeding members 204 on distal ends of the accessory holders 102. The mounting holes 202 are in a rectangular pattern having sides x and x'. In the illustrated exemplary embodiment x is 5¾ inches and x' is 5¾ inches. Alternate embodiments may include different dimensions.

Figure 3:
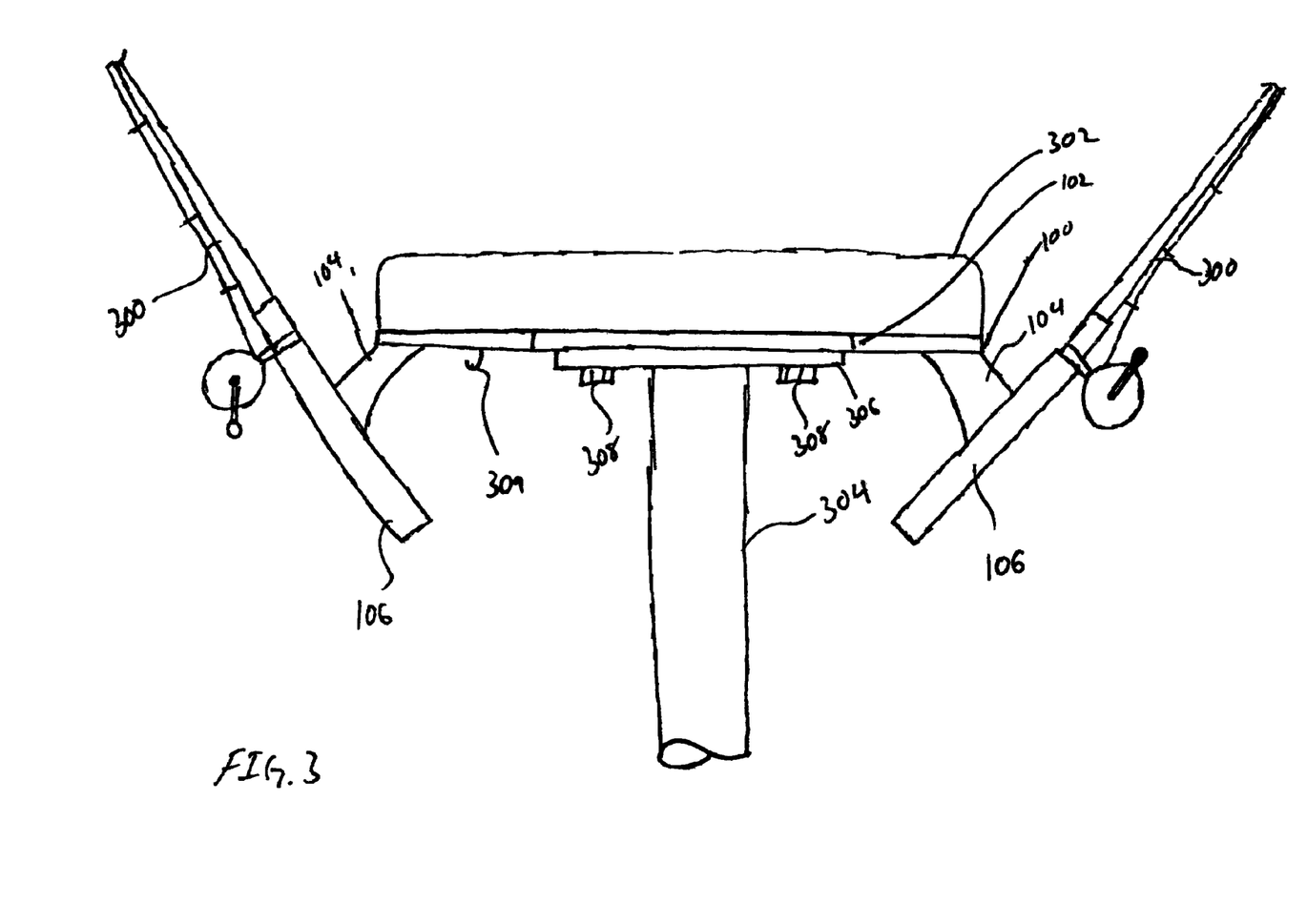
FIG. 3 illustrates side view of an example of the apparatus of FIG. 1 mounted to a seat.

FIG. 3 illustrates side view of an example of the apparatus 100 mounted to a seat 302. The illustrated embodiment includes a post 304 with a seat support plate (plate) 306. The post 304 may be attached at a distal end to the deck of a boat (not shown), for example. In assembly, the mounting member 102 of the apparatus 100 is disposed on the plate 306, and arranged such that the holes 202 (of FIG. 2) align with similar holes (not shown) in the plate. The seat 302 is arranged on the mounting member 102 and has holes that are aligned with the holes 202. Fasteners 308 engage the plate 306, the mounting member 102 and the seat 302 by passing through the holes in the plate 306, the holes 202 in the mounting member 102 and engaging threaded holes in the seat 302. In the illustrate embodiment, the accessory holders 106 are sized, shaped, and angled to retain accessories 300, such as for example, fishing rods. The illustrated embodiment includes a hook 309 that may be arranged on the mounting member 102.

Figure 4:
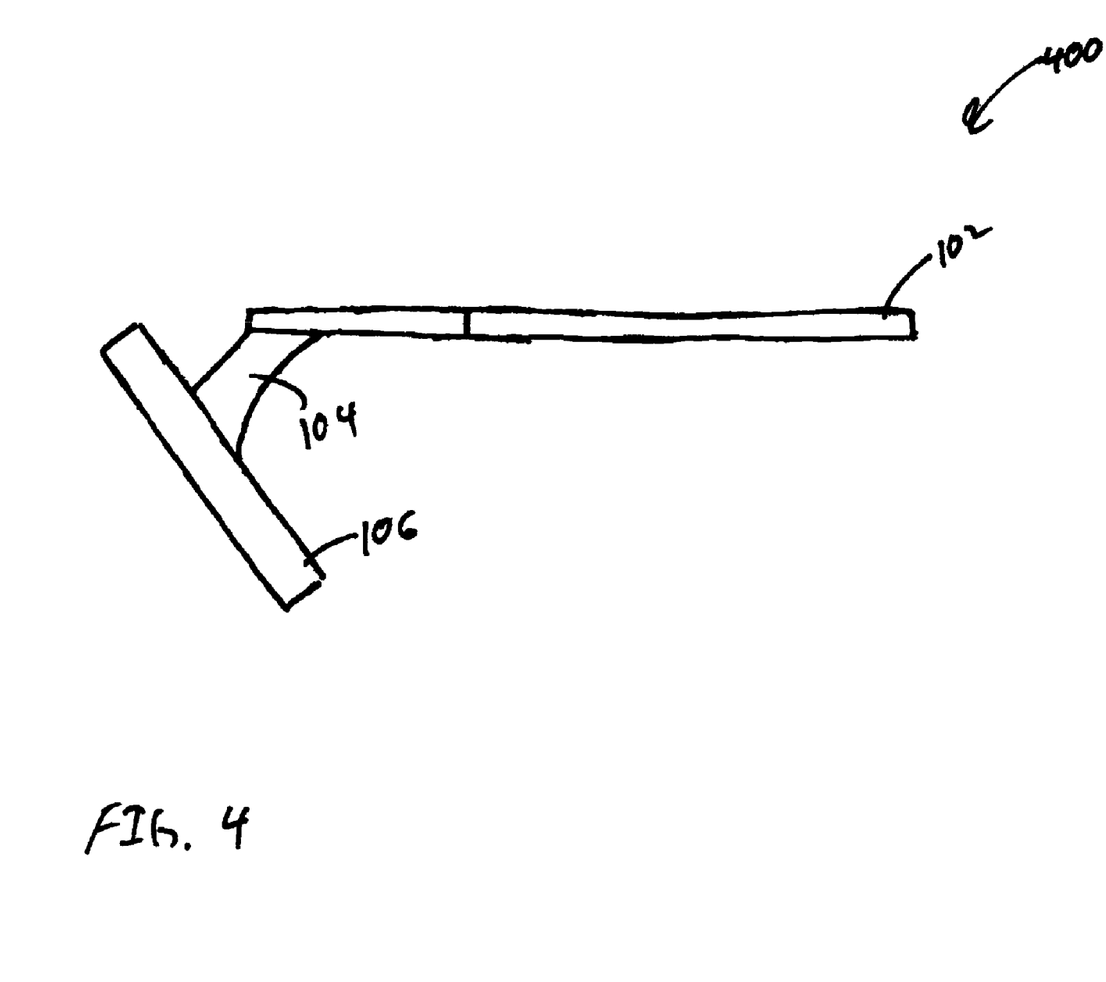
FIG. 4 illustrates a side view of an alternate exemplary embodiment of an apparatus.

FIG. 4 illustrates a side view of an alternate exemplary embodiment of an apparatus 400. The apparatus 400 is similar to the apparatus 100 described above, and includes a single extension member 104 and accessory holder 106 connected to the mounting plate 102.

Figure 5:
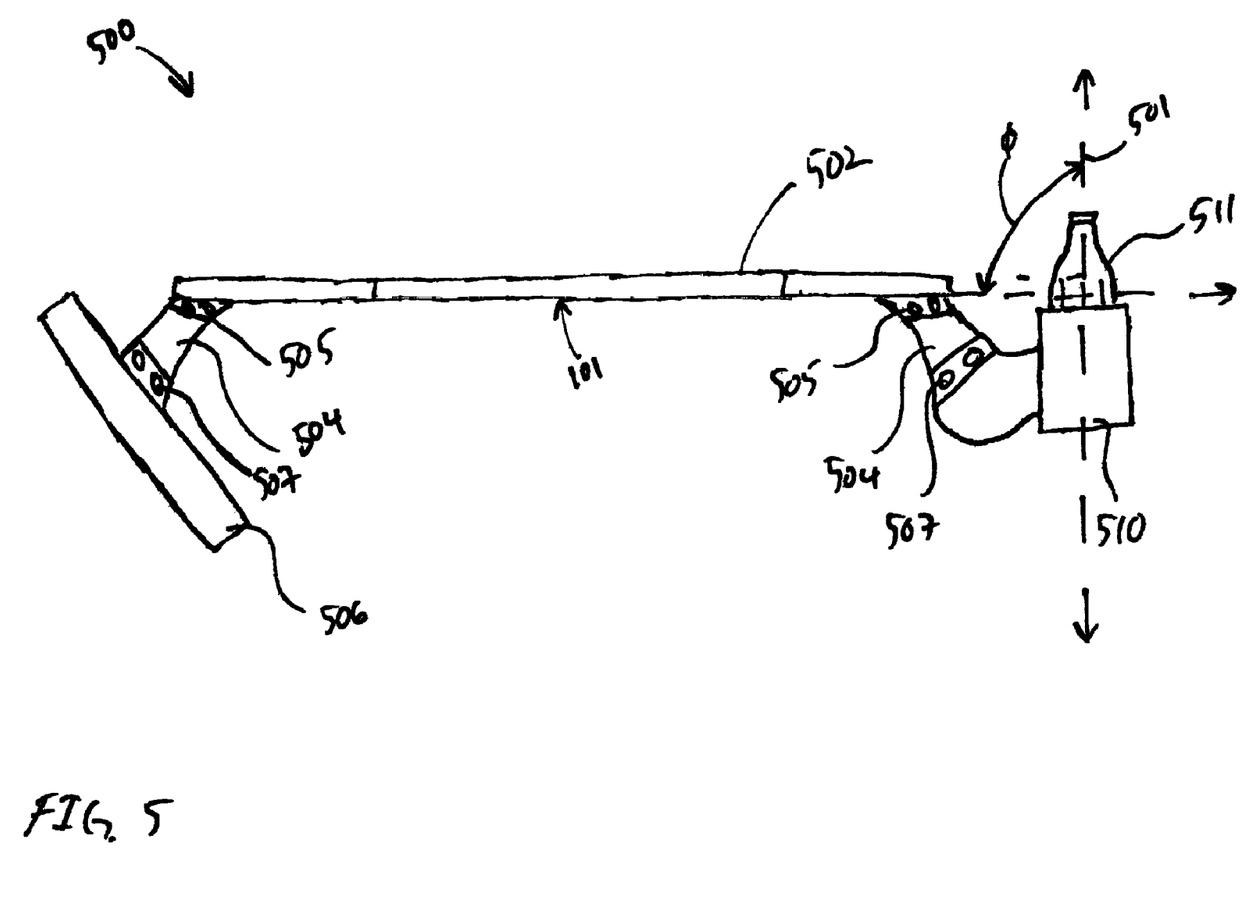
FIG. 5 illustrates a side view of another exemplary embodiment of an apparatus.

FIG. 5 illustrates a side view of another exemplary embodiment of an apparatus 500. The apparatus 500 includes a mounting member 502 that is similar to the mounting member 102 described above. Extension members 504 may be connected to the mounting member 502 with, for example, fasteners 505. An accessory holder 506 is connected to one of the extension member 504, and may be attached with fasteners 507. The illustrated embodiment includes an accessory holder 510 that is sized and shaped to hold a liquid container 511 such as, for example, a bottle, cup, or can. The accessory holder 510 of the illustrated embodiment defines a longitudinal axis 501 that is arranged at an angle (φ) relative to the first planar surface 101.

Figure 6:
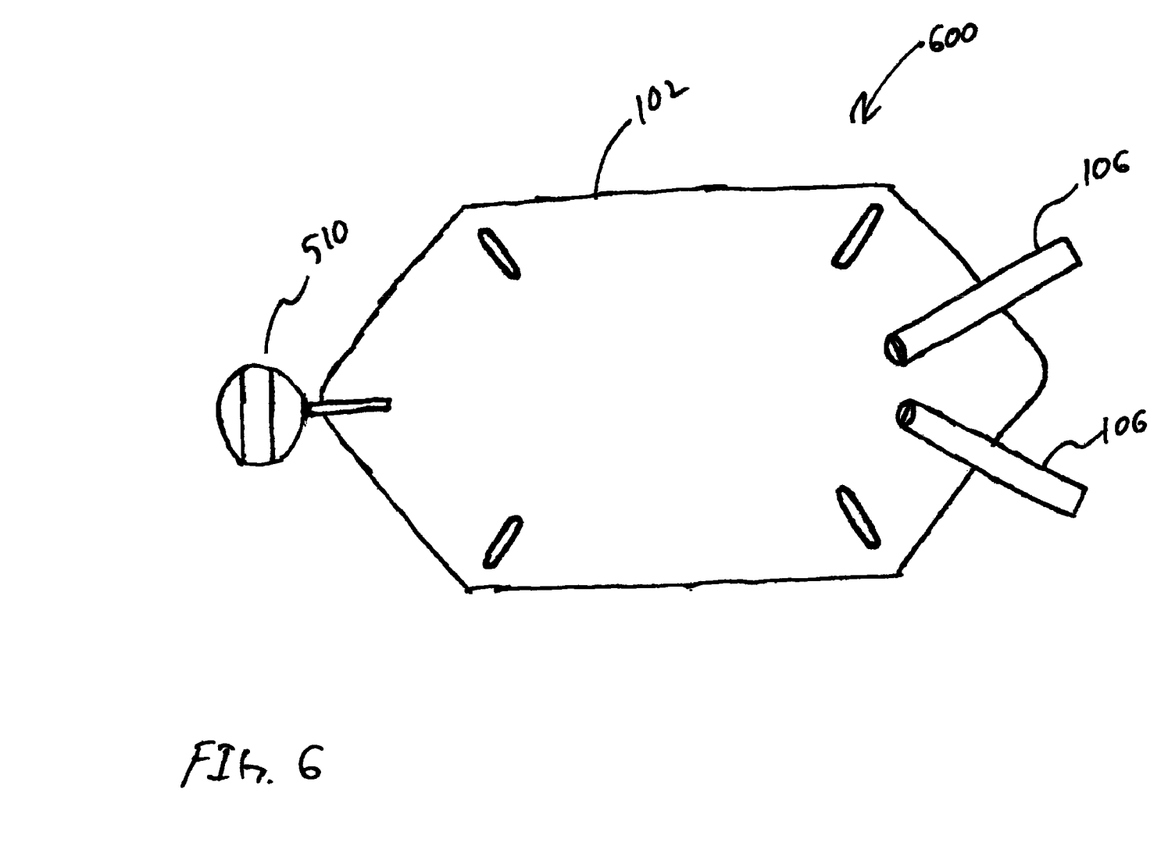
FIG. 6 illustrates a bottom view of another exemplary embodiment of an apparatus.

FIG. 6 illustrates a bottom view of another exemplary embodiment of an apparatus 600. The apparatus 600 includes a pair of accessory holders 106 and an accessory holder 510 arranged on the mounting member 102.

Figure 7:
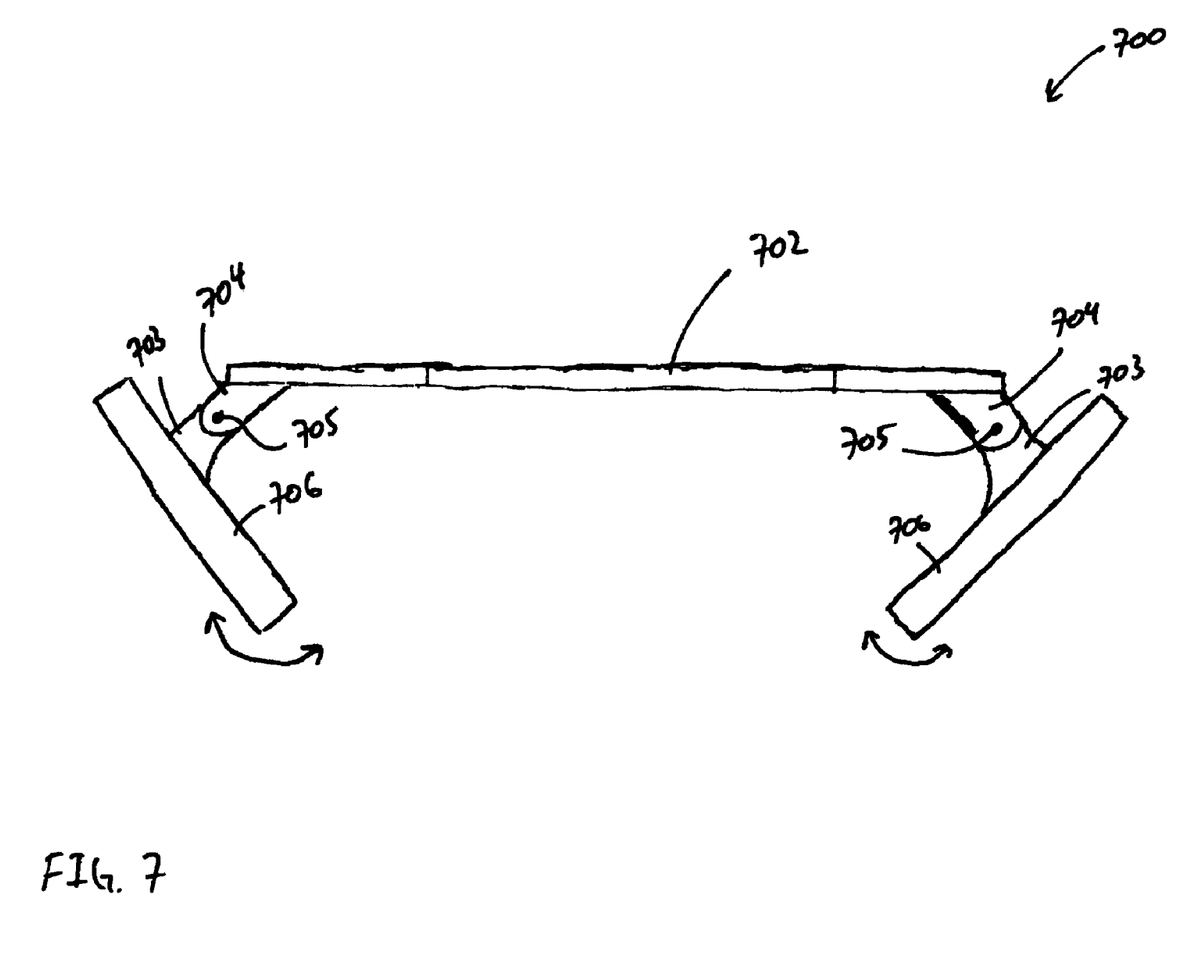
FIG. 7 illustrates a side view of another exemplary embodiment of an apparatus.

FIG. 7 illustrates a side view of another exemplary embodiment of a holding apparatus 700. The holding apparatus 700 includes a mounting member 702 that is similar to the mounting member 102 (of FIG. 1) described above. The apparatus 700 includes extension members 704 extending from the mounting member 702. Accessory holders 706 include a mounting portion 703 that includes an orifice that is arranged to align with a corresponding orifice in the extension member 704. When the orifices are aligned, a fastener 705 engages the orifices of the mounting portion 703 and the extension member 704. The accessory holders 706 are operative to pivot about an axis of rotation defined by the longitudinal axis of the fastener 705. The arrangement of the extension members 704 and the accessory holders 706 may be secured in a desired position by the fastener 705.

Figure 8:
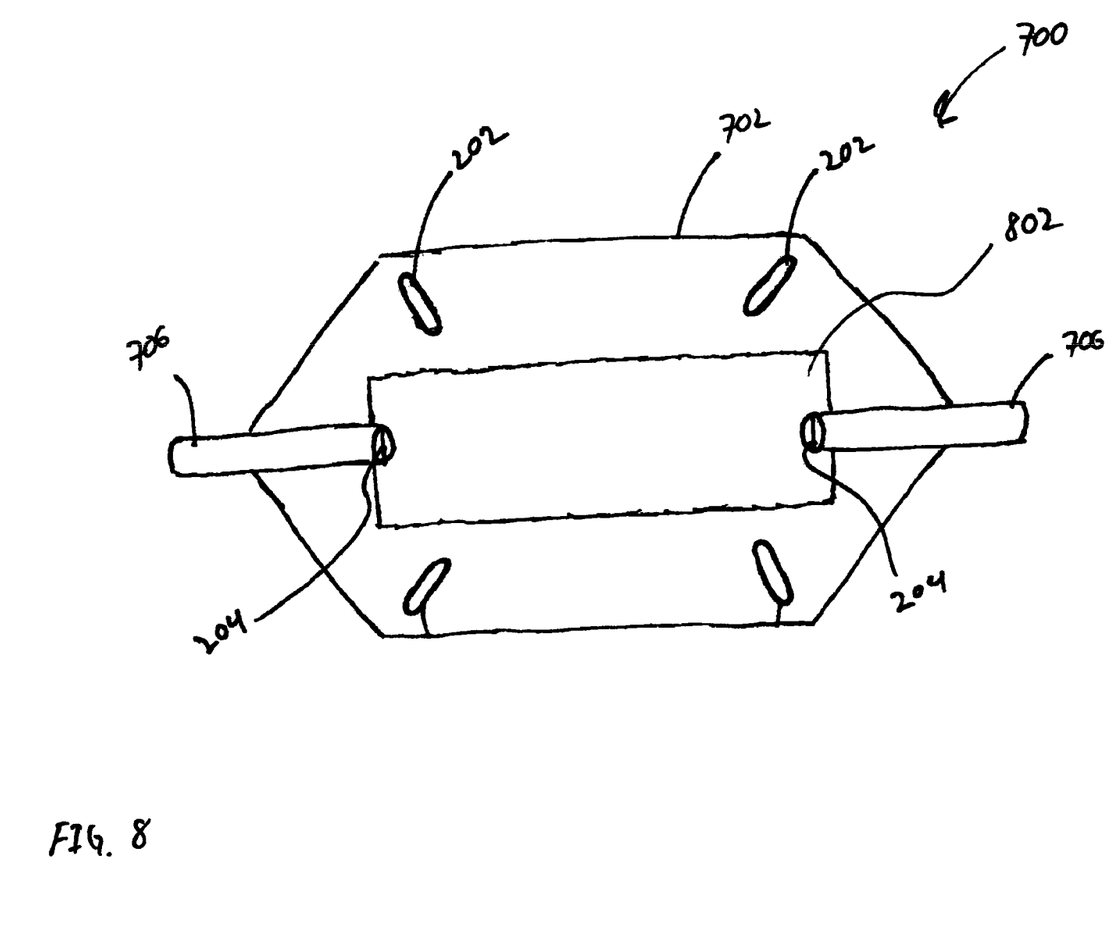
FIG. 8 illustrates a bottom view of the apparatus of FIG. 7.

FIG. 8 illustrates a bottom view of the holding apparatus 700. The mounting member 702 of the illustrated embodiment includes an orifice 802, however alternate embodiments may not include the orifice 802.

Figure 9:
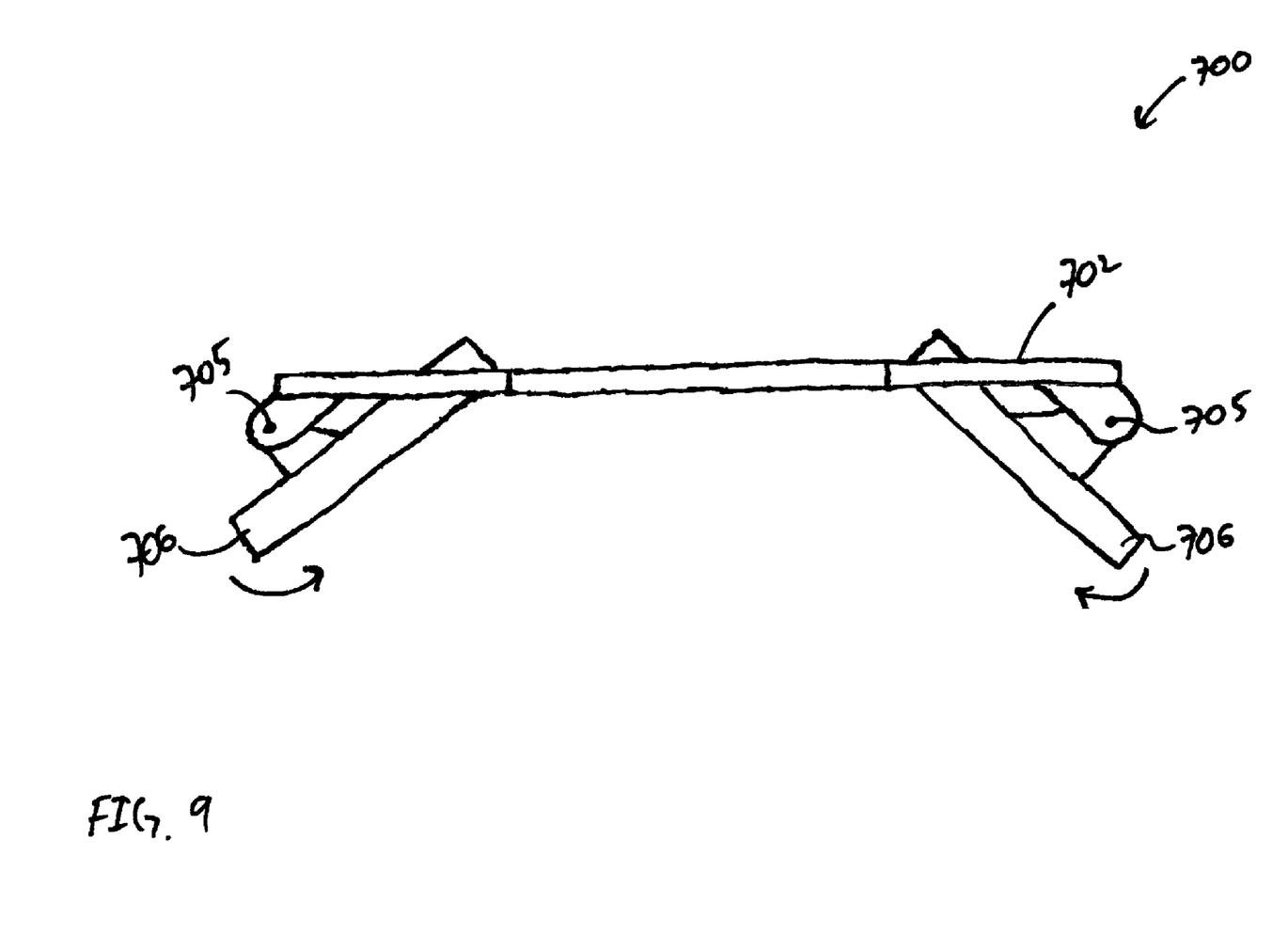
FIG. 9 illustrates a side view of the holding apparatus of FIG. 7.

FIG. 9 illustrates a side view of the holding apparatus 700, where the accessory holders 706 have been arranged such that portions of the accessory holders 706 pass through the orifice 802 (of FIG. 8) by being pivoted about the fasteners 705. Such an arrangement of the accessory holders 706 reduces the dimensions of the holding apparatus 700 and may be used in packaging and shipping the holding apparatus 700 to reduce packaging, shipping, and shelf space consumption and costs. Though the illustrated embodiment shows the accessory holders 706 engage the orifice 802, alternate embodiments may be similarly arranged without the accessory holders 706 passing through the orifice 802. For example, the accessory holders 706 may be pivoted about the fasteners 705 to reduce the dimensions of the apparatus 700 without passing through the orifice 802, which may or may not be included in alternate embodiments.

Figure 10:
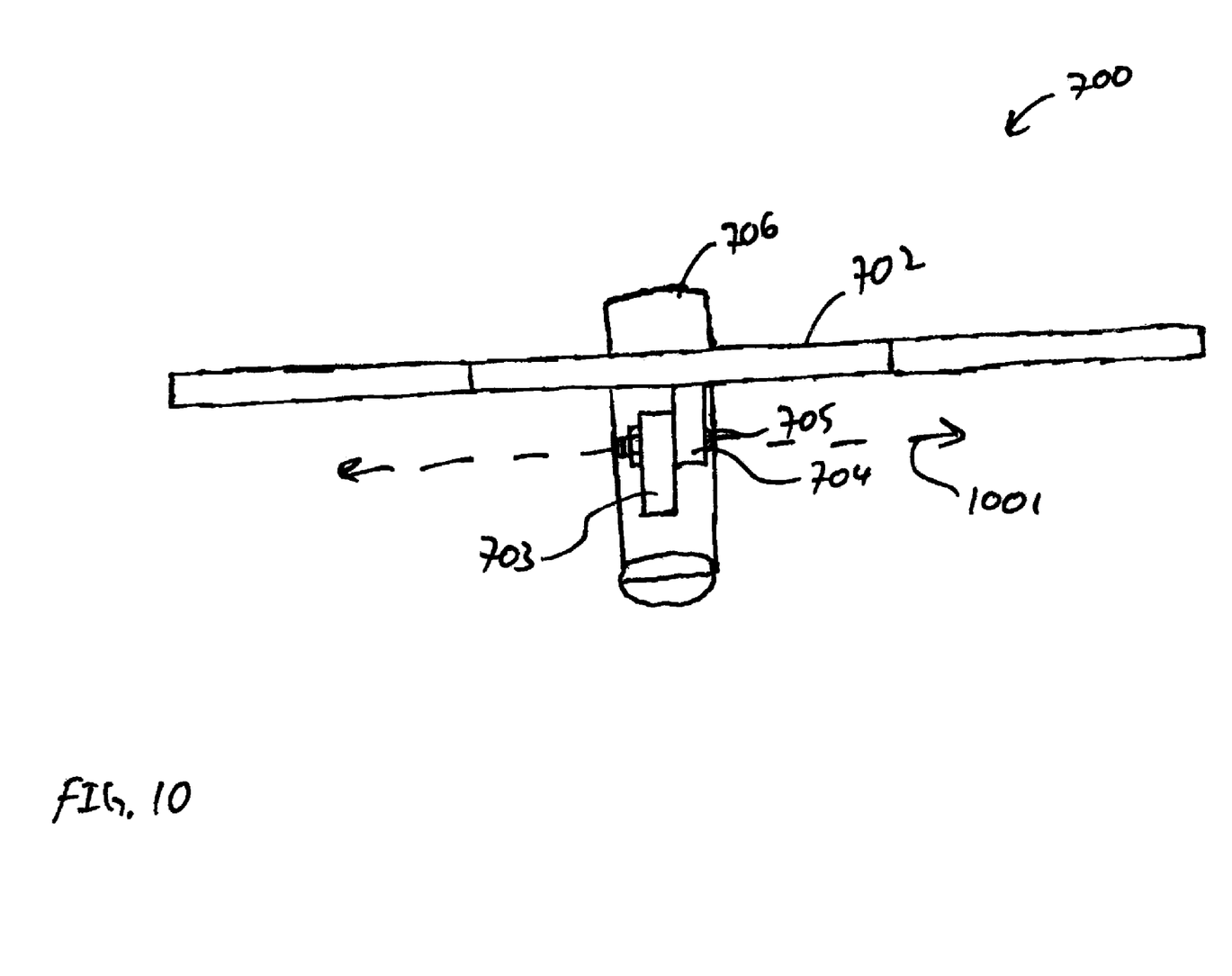
FIG. 10 illustrates an end view of the holding apparatus of FIG. 7.

FIG. 10 illustrates an end view of the holding apparatus 700. The line 1001 illustrates the axis of rotation or pivotal axis defined by the fastener 705.

Figure 11:
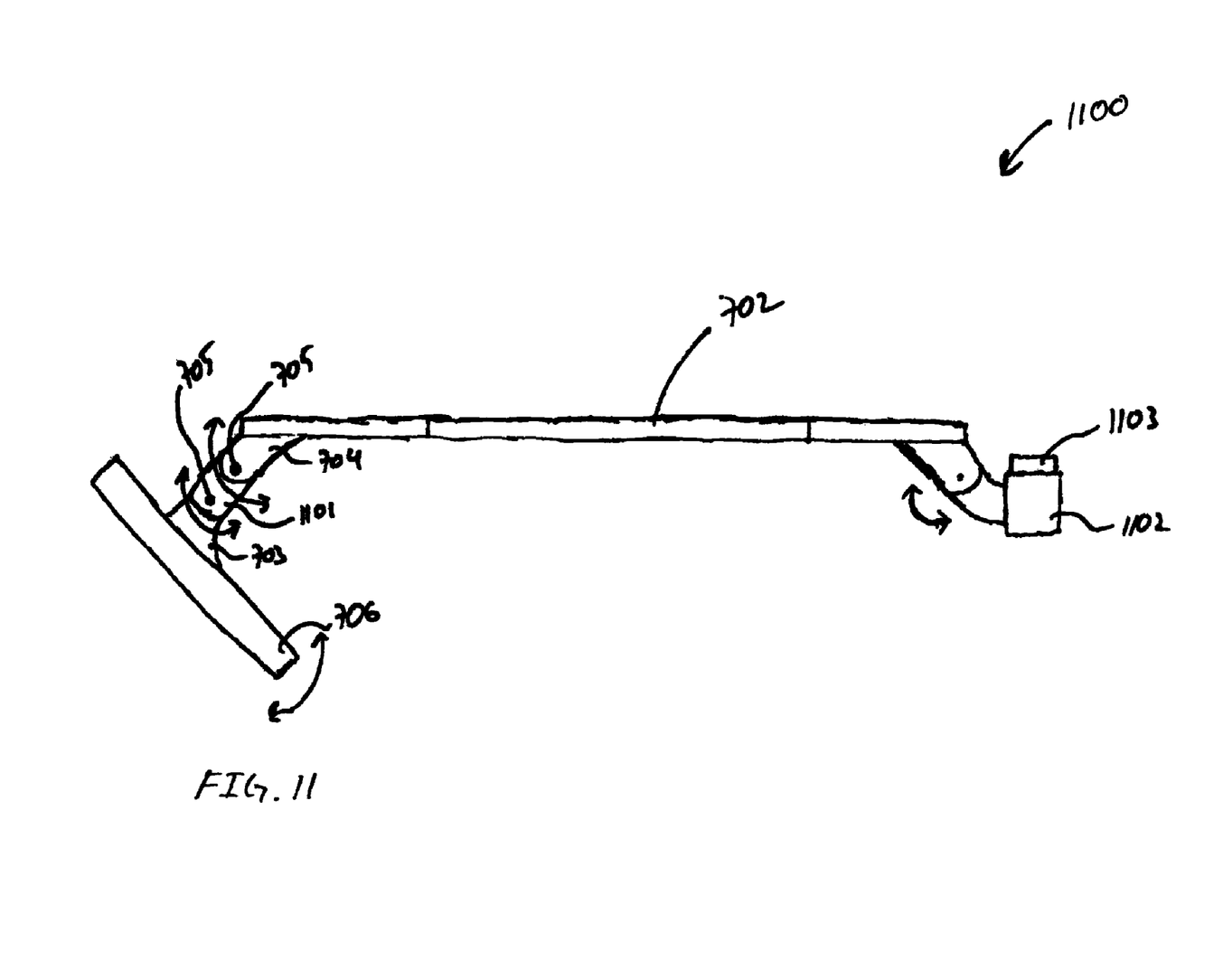
FIG. 11 illustrates another alternate embodiment of an apparatus.

FIG. 11 illustrates another alternate embodiment of a holding apparatus 1100. The holding apparatus 1100 includes an intermediary extension member 1102 that is disposed between the mounting portion 703 of the accessory holder 706 and the extension member 704 of the mounting member 702. The intermediary extension member 1102 is operative to extend a distance between the accessory holder 706 and the mounting member 702. The intermediary extension member 1102 includes two orifices, where one orifice is aligned with the orifice of the extension member 704 and the other orifice is aligned with the orifice of the mounting portion 703 of the accessory holder 706. Fasteners 705 engage the aligned orifices and are used to secure the assembly in a desired position. The illustrated embodiment may also include a holder portion 1102 that is operative to hold an organizer container 1103 such as, for example, a tackle box or similar container.

The illustrated embodiments described above are mere examples. Other embodiments may include, for example, any number of accessory holders arranged in any configuration on the mounting member 102. The accessory holders may be sized, shaped, angled, and placed such that they may hold any type of accessory including for example, fishing rods, liquid containers, and boating accessories such as radio devices. Alternate exemplary embodiments of the accessory holder may include, for example, a square or boxed shaped container. The holes 202 described above are arranged and sized to fit the dimensions of the mounting holes of the seat 302. The apparatuses may be assembled in combination such that, for example, a plurality of apparatuses may be arranged in a stack and secured with fasteners under the seat 302.

While the preferred embodiment to the invention has been described, it will be understood that those skilled in the art, both now and in the future, may make various improvements and enhancements which fall within the scope of the claims.

What is claimed is:

1. An apparatus including:
   a mounting member including a first planar surface and an opposing second planar surface, the first planar surface including a region partially defined by mounting holes operative to secure the mounting member to a seat support plate that contacts the region of the first planar surface, and the second planar surface is operative to contact a seat such that the mounting member is operative to be arranged between the seat and the seat support plate, wherein at least one mounting hole of the mounting member aligns with a corresponding mounting hole of the seat support plate and a corresponding mounting hole of the seat;
   a first extension member extending from the first planar surface; and
   a first accessory holder portion connected to the first extension member.

2. The apparatus of claim 1, wherein the mounting member defines mounting holes arranged in a rectangular pattern.

3. The apparatus of claim 1, wherein the first extension member includes:
   a first extension portion extending from the first planar surface, the first extension member including a first orifice;

a second extension portion including a second orifice, the second orifice aligned with the first orifice of the first extension portion; and a fastener engaging the first orifice and the second orifice.

4. The apparatus of claim 3, wherein the first accessory holder is connected to the second extension portion.

5. The apparatus of claim 1, wherein the mounting member defines at least one orifice in a mounting region of the mounting member.

6. The apparatus of claim 1, wherein the first accessory holder portion is connected to the first extension member with a fastener.

7. The apparatus of claim 1, wherein the first accessory holder portion includes:

a tubular shaped portion; and an impeding member arranged at a distal end of the first accessory holder.

8. The apparatus of claim 7, wherein the first accessory holder defines a longitudinal axis, the longitudinal axis disposed substantially perpendicular to the first planar surface.

9. The apparatus of claim 1, wherein the apparatus includes:

at least a second extension member extending from the first planar surface; and at least a second accessory holder portion connected to the second extension member.

10. The apparatus of claim 1, wherein the apparatus includes a fastener engaging the mounting hole of the seat support plate, the mounting hole of the mounting member and the mounting hole of the seat.

11. The apparatus of claim 1, wherein the first accessory holder portion includes a tubular portion.

12. A method for mounting an apparatus to a seat, the method including:

arranging the apparatus including a mounting member including a mounting hole, a first extension member extending from a first planar surface, and a first accessory holder portion connected to the first extension member on a seat support portion including a mounting hole, such that the first planar surface contacts the seat support portion;

arranging the seat including a mounting hole on a second opposing planar surface of the mounting member such that the second planar surface contacts the seat, and the mounting hole of the mounting member is aligned with the mounting hole of the seat support portion and the mounting hole of the seat; and securing the mounting member and the seat to the seat support portion with a fastener that engages the mounting hole of the mounting member, the mounting hole of the seat support portion, and the mounting hole of the seat.

* * * * *